(12) United States Patent
Fujimori

(10) Patent No.: US 8,595,286 B2
(45) Date of Patent: Nov. 26, 2013

(54) MANAGEMENT APPARATUS FOR MANAGING COMMUNICATION BETWEEN PLURAL INFORMATION PROCESSING APPARATUSES, INFORMATION PROCESSING SYSTEM INCLUDING THE MANAGEMENT APPARATUS, METHOD FOR CONTROLLING THE MANAGEMENT APPARATUS, NON-TRANSITORY COMPUTER-READABLE RECODING MEDIUM STORING PROGRAM FOR CONTROLLING THE MANAGEMENT APPARATUS

(75) Inventor: Takafumi Fujimori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 363 days.

(21) Appl. No.: 12/558,225

(22) Filed: Sep. 11, 2009

(65) Prior Publication Data

US 2010/0082730 A1 Apr. 1, 2010

(30) Foreign Application Priority Data

Sep. 30, 2008 (JP) ................................. 2008-252937

(51) Int. Cl.
*G06F 15/16* (2006.01)
(52) U.S. Cl.
USPC ........... 709/202; 709/206; 709/220; 709/223; 709/224; 709/246
(58) Field of Classification Search
USPC .................. 709/206, 220, 223, 224, 230, 246
See application file for complete search history.

(56) References Cited

U.S. PATENT DOCUMENTS

| 5,651,006 | A | | 7/1997 | Fujino et al. | |
|---|---|---|---|---|---|
| 6,003,077 | A | * | 12/1999 | Bawden et al. | 709/223 |
| 6,697,845 | B1 | | 2/2004 | Andrews | |
| 7,761,520 | B2 | * | 7/2010 | Fujimori | 709/206 |
| 2003/0084200 | A1 | * | 5/2003 | Buehler et al. | 709/318 |

(Continued)

FOREIGN PATENT DOCUMENTS

| JP | 07-334445 | 12/1995 |
|---|---|---|
| JP | 11-065951 | 3/1999 |

(Continued)

OTHER PUBLICATIONS

Office Action issued Sep. 25, 2012 in corresponding Japanese Patent Application No. 2008-252937 (4 pages) (4 pages English translation).

(Continued)

*Primary Examiner* — Wing F Chan
*Assistant Examiner* — Hitesh Patel
(74) *Attorney, Agent, or Firm* — Staas & Halsey LLP

(57) ABSTRACT

A management apparatus connected to a information processing apparatus includes a first processing unit that receives a data request containing the identification information identifying the first information processing apparatus according to a first protocol from a second information processing apparatus connected to the first information processing apparatus through the management apparatus, an information storage unit that stores the address information indicating the address of the first information processing apparatus and a second processing unit that receives the data request from the first processing unit, acquires the address information from the information storage unit based on the identification information and transmits the data request according to a second protocol to the first information processing apparatus corresponding to the acquired address information.

7 Claims, 7 Drawing Sheets

(56) References Cited

U.S. PATENT DOCUMENTS

| | | | |
|---|---|---|---|
| 2004/0010323 A1* | 1/2004 | Martin et al. | 700/3 |
| 2006/0010488 A1* | 1/2006 | Fujimori | 726/6 |
| 2006/0026301 A1* | 2/2006 | Maeda et al. | 709/246 |
| 2006/0092931 A1* | 5/2006 | Walter et al. | 370/389 |

FOREIGN PATENT DOCUMENTS

| | | |
|---|---|---|
| JP | 2002-014883 | 1/2002 |
| JP | 2002-215479 | 8/2002 |
| JP | 2005-038296 | 2/2005 |
| JP | 2006-023922 | 1/2006 |
| JP | 2007-102541 | 4/2007 |

OTHER PUBLICATIONS

Japanese Office Action mailed Aug. 6, 2013 in corresponding Japanese Patent Application No. 2008-252937 (3 pages) (2 pages English Translation).

* cited by examiner

FIG. 4

| IDENTIFIER | OID | STATUS INFORMATION | IP ADDRESS | COMMUNICATION METHOD | AUTHENTICATION METHOD | ENCRYPTION METHOD | ACCOUNT | PASSWORD |
|---|---|---|---|---|---|---|---|---|
| SERVER 1 | enterprises.211.1.31.1.2.1 | RUNNING | 192.168.1.1 | TCP/IP | — | AES | — | lqbeeamfk34 |
| SERVER 2 | enterprises.211.1.31.1.2.2 | OFF | — | — | — | — | — | — |
| SERVER 3 | enterprises.211.1.31.1.2.3 | RUNNING | 192.168.1.3 | USP/SNMPv3 | MD5 | DES | psa | 0a9ee667pf |

US 8,595,286 B2

MANAGEMENT APPARATUS FOR MANAGING COMMUNICATION BETWEEN PLURAL INFORMATION PROCESSING APPARATUSES, INFORMATION PROCESSING SYSTEM INCLUDING THE MANAGEMENT APPARATUS, METHOD FOR CONTROLLING THE MANAGEMENT APPARATUS, NON-TRANSITORY COMPUTER-READABLE RECODING MEDIUM STORING PROGRAM FOR CONTROLLING THE MANAGEMENT APPARATUS

CROSS-REFERENCE TO RELATED APPLICATIONS

This application is based upon and claims priority to prior Japanese Patent Application No. 2008-252937 filed on Sep. 30, 2008 in the Japan Patent Office, the entire contents of which are incorporated herein by reference.

FIELD

This invention relates to a management apparatus, an information processing apparatus, a management apparatus control method and a program.

BACKGROUND

One of the methods of managing the information processing apparatus as a server is to use a protocol called SNMP (Simple Network Management Protocol). In this method using SNMP, the management information for each server managed is called an object which is identified by an object ID (OID: Object IDentification). The server managed has a data base (DB) called a management information base (MIB) for managing the OID in a tree structure. A control manager transmits a management information acquisition request to an agent of each server. When the agent operating on each server receives the management information acquisition request, the agent accesses the MIB based on the OID in the management information acquisition request and acquires the management information on the server with the agent operated and transmits the management information to the control manager. As a result, the control manager can acquire the management information on the server.

In the case where server is managed directly by the control manager as described above, the control manager needs to communicate with each agent operating on each server that is target of management to manage the particular server, however, this is liable to complicate the server management by the control manager.

See [Patent Document 1] Japanese Laid-open Patent Publication No. 7-334445, [Patent Document 2] Japanese Laid-open Patent Publication No. 2002-215479, [Patent Document 3] Japanese Laid-open Patent Publication No. 2002-14883, [Patent Document 4] Japanese Laid-open Patent Publication No. 11-65951, [Patent Document 5] Japanese Laid-open Patent Publication No. 2006-23922.

SUMMARY

In view of the above, a technique has been proposed in which a server management unit is arranged between the control manager and the server to unify the management of the agents of the servers while the control manager only accesses the server management unit to acquire the management information on each server.

According to an aspect of the invention, a management apparatus connected to a information processing apparatus includes a first processing unit that receives a data request containing the identification information identifying the first information processing apparatus according to a first protocol from a second information processing apparatus connected to the first information processing apparatus through the management apparatus, an information storage unit that stores the address information indicating the address of the first information processing apparatus and a second processing unit that receives the data request from the first processing unit acquiring the address information from the information storage unit based on the identification information and transmitting the data request according to a second protocol to the first information processing apparatus corresponding to the acquired address information.

It is to be understood that both the foregoing general description and the following detailed description are exemplary and explanatory and are not restrictive of the invention, as claimed.

BRIEF DESCRIPTION OF DRAWINGS

FIG. 4 is a diagram depicting an example of the server information stored in the table of a server information data base;

DETAILED DESCRIPTION OF EMBODIMENT(S)

An embodiment of the invention will be explained below with reference to the drawings.

(Server System)

Figure 1:
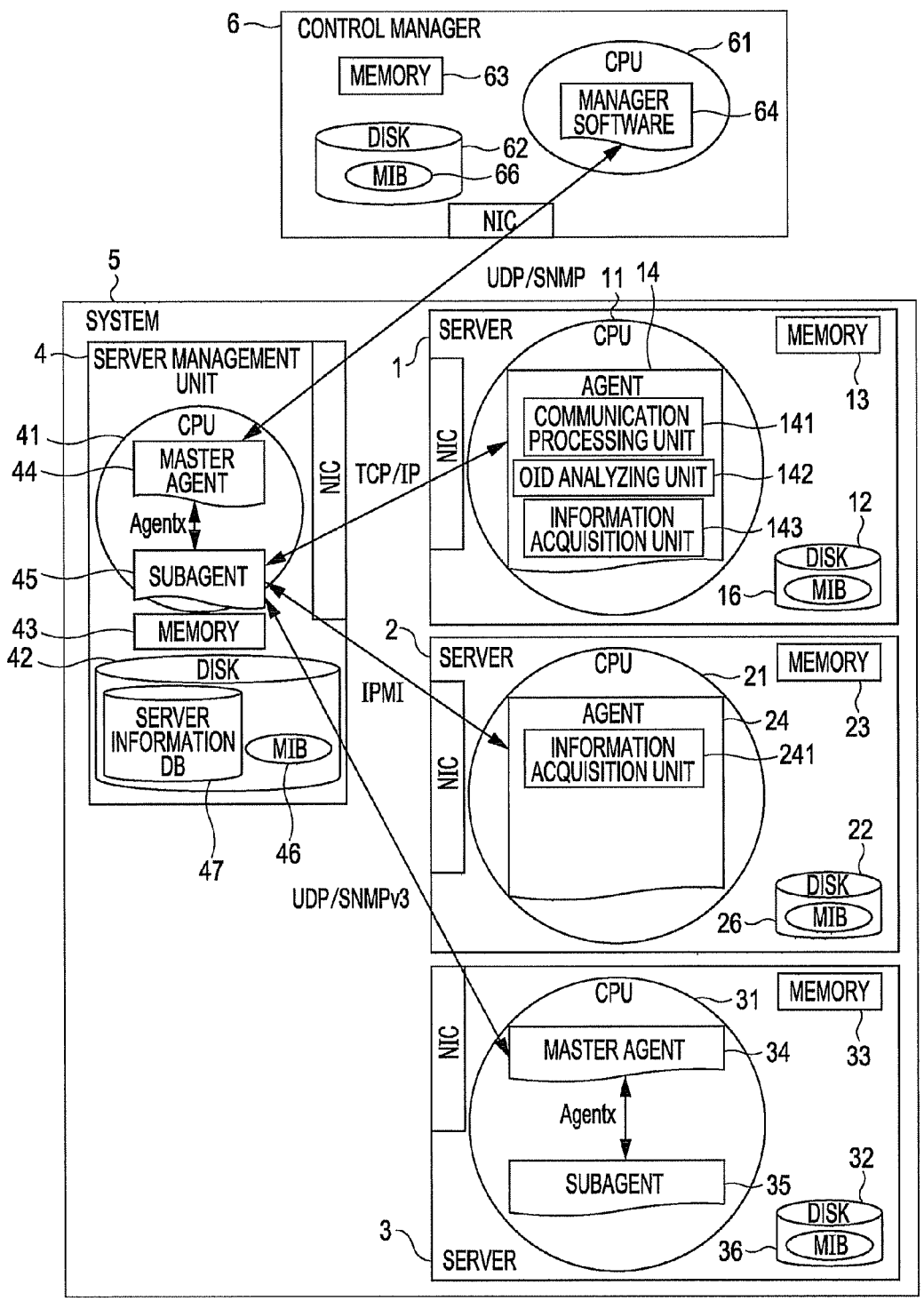
FIG. 1 is a diagram depicting an example of the configuration of a server system according to an embodiment.

First, the server system according to an embodiment will be explained below with reference to FIG. 1. FIG. 1 is a diagram depicting an example of the configuration of the server system according this embodiment.

The server system having an information processing system depicted in FIG. 1 includes a system 5 and a control manager 6. For example, like a blade server, the system 5 has a server management unit 4 and a plurality of servers 1 to 3 therein. The server management unit 4 and the plurality of servers 1 to 3 can each be an independent computer. In the system 5, the server management unit 4 functions as a server management apparatus for centrally managing the servers 1 to 3 associated with the system 5.

The control manager 6 includes a CPU (Central Processing Unit) 61, a disk 62 and a memory 63, and the control manager 6 is connected to the server management unit 4 through a NIC (Network Interface Card). In the control manager 6, the operation is performed according to the manager software 64. The manager software 64 is a program executed by the CPU 61. The control manager 6 communicates with the server management unit 4 of the system 5 using the manager software 64 according to the UDP/SNMP (User Datagram Protocol/Simple Network Management Protocol) (hereinafter, simply referred to as "SNMP"). Incidentally, the simple expression "SNMP" indicates SNMPv1 or SNMPv2 unless otherwise specified in the description that follows.

The server management unit 4 has a CPU 41, a disk 42 as an auxiliary storage unit and a memory 43 as a main storage unit. The server management unit 4 is connected with other servers through a NIC.

In the server management unit 4, a master agent 44 and a subagent 45 operate. The master agent 44 and the subagent 45 are an extended SNMP agent standardized under RFC2741 (Request For Comments 2741). The "agent" is defined as a kind of a process operated by a CPU executing the program. The master agent 44 and the subagent 45 are a process operated by the CPU 41 executing the program. The communication between the master agent 44 and the control manager 6 is conducted with the SNMP protocol. For example the communication between the master agent 44 and the subagent 45 is conducted with the Agent Extensibility (AgentX) protocol. The AgentX protocol is the one of the extended SNMP agent standardized under RFC2741.

The disk 42 stores a server information data base 47 and a MIB 46. The table of the server information data base 47 stores the communication setting information needed for communication with the servers 1 to 3 and including the protocol for communication with the servers 1 to 3. The subagent 45 communicates with the servers 1 to 3 by protocol conversion from the AgentX protocol to various protocols such as the TCP/IP (Transmission Control Protocol/Internet Protocol) based on the communication setting information stored in the table of the server information data base 47. The TCP is a protocol for transmission by confirming the arrival of each packet. And the IP is a protocol for transmission using an IP (Internet Protocol) address for specifying an address.

The server 1 includes a CPU 11, a disk 12 storing a MIB 16, and a memory 13 and is connected to the server management unit 4 through the NIC. An agent 14 operates in the server 1. The agent 14 is a process operated by the CPU 11 executing a program. The agent 14 includes a communication processing unit 141, an OID analyzing unit 142 and an information acquisition unit 143. The agent 14 communicates with the subagent 45 of the server management unit 4 according to the TCP/IP protocol. According to the UDP which is a protocol of the transport layer of SNMP, on the other hand, the packet is transmitted to the destination without confirmation of the arriving of the packet. The communication between the server management unit 4 and the server 1 is conducted according to SNMP, therefore, the communication between the server management unit 4 and the server 1 is higher in reliability than the communication conducted according to the UDP of the SNMP.

The server 2 includes a CPU 21, a disk 22 storing a MIB 26, and a memory 23, and is connected to the server management unit 4 through the NIC. An agent 24 operates in the server 2. The agent 24 is a process operated by the CPU 21 executing a program. The agent 24 includes an information acquisition unit 241. The agent 24 communicates with the subagent 45 of the server management unit 4 according to the IPMI (Intelligent Platform Management Interface) protocol. The IPMI is a protocol for exchanging information to remotely control and monitor the physical state of the server such as the temperature, voltage, the fan operation and the power supply for example. By employing IPMI as a protocol for communication between the server management unit 4 and the server 2, therefore, the information can be exchanged to monitor and remotely control the physical state of the server 2.

The server 3 includes a CPU 31, a disk 32 storing a MIB 36, and a memory 33 and is connected to the server management unit 4 through the NIC. The master agent 34 and the subagent 35 are operated in the server 3. The master agent 34 and the subagent 35 are a process activated by the CPU 31 executing a program. The communication is conducted between the master agent 34 and the subagent 35 according to the AgentX protocol. The master agent 34 communicates with the subagent 45 of the server management unit 4 according to the UDP/SNMPv3 (User Datagram Protocol/Simple Network Management Protocol version 3) protocol. The SNMPv3 is a protocol having the function of authenticating and encrypting the SNMP packets. The communication between the server management unit 4 and the server 3 is established according to SNMPv3, therefore, the communication between the server management unit 4 and the server 3 has a higher security than the communication conducted according to other SNMP (SNMPv1 (Simple Network Management Protocol version 1), SNMPv2 (Simple Network Management Protocol version 2)) than SNMPv3.

Next, the management information request and the response in the server system depicted in FIG. 1 will be explained below.

The management information request data requesting the acquisition of the management information of the servers 1 to 3 is transmitted by the control manager 6 to the master agent 44 of the server management unit 4 according to SNMP. The management information request data has an OID designating the destination server and the management information desired by the control manager 6.

Figure 2A:
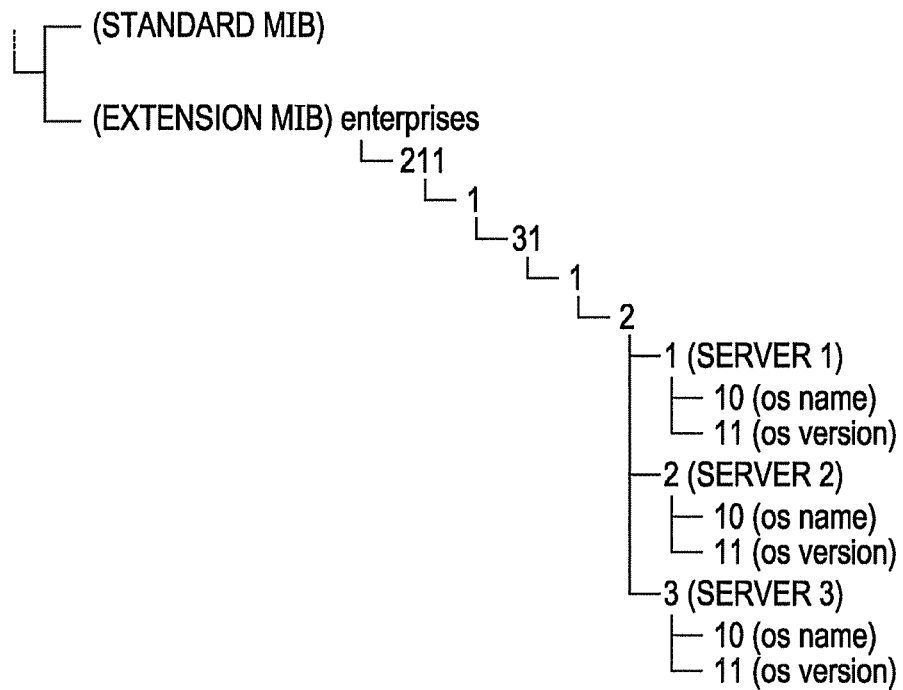
FIGS. 2A-2B are diagrams depicting examples of the OID structure.
Figure 2B:
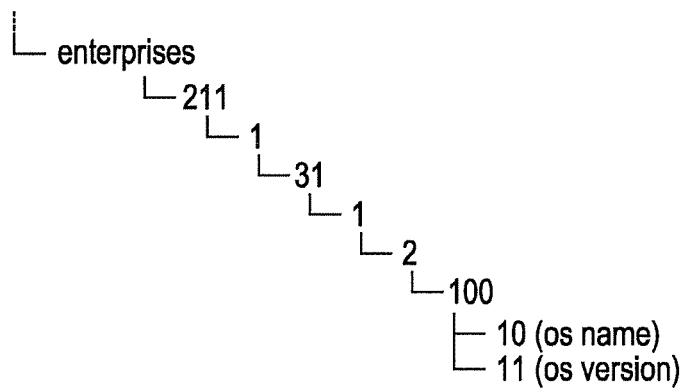

FIGS. 2A and 2B depict examples of the tree structure of the OID defined in each of the MIB 66 of the control manager 6 and the MIB 46 of the server management unit 4, respectively. The control manager 6 designates the OID of the management information request data by accessing the MIB 66 having the OID tree structure depicted in FIG. 2A. As depicted in FIG. 2A, the OID designated by the control manager 6 is classified into the standard MIB and the extension MIB. The standard MIB is the OID predefined to acquire the standard interface and the internal information of the server management unit 4 depicted in FIG. 1 of the server to which the management information request data is transmitted. On the other hand, the extension MIB is the OID extended in such a manner as to be uniquely definable by the vendor or the like. The OID indicated in the tree at and below the "enterprises" in FIG. 2A is an extension MIB. In the case where the management information request data is transmitted from the master agent 44 to the subagent 45, the control manager 6 designates the OID of the management information request data with the extension MIB. For example, in the case where the control manager 6 is desirous of acquiring the name of the operating system of the server 1, the OID of the management information request data is designated as "enterprises.211.1.31.1.2.1.10" by defining the numeral in each layer with a period along the path in the tree of FIG. 2A with reference to the MIB 66. Also, if desirous of acquiring the information of the OS version of the server 1, the control manager 6 similarly designates "enterprises.211.1.31.1.2.1.11" as the OID of the management information request data with reference to the MIB 66.

FIG. 2B depicts an example of the tree structure of the OID defined in the same way for the MIB 16, 26, 27 of the servers 1 to 3. In the OID shared by the MIB 16, 26, 27 of the servers 1 to 3, the values "1", "2" and "3" indicating the servers are replaced by a common value "100" as depicted in FIG. 2B unlike the OID depicted in FIG. 2A.

The master agent 44 transmits the management information request data to the subagent 45 upon judgment that the OID of the management information request data is matching (for example, identical) with any one of OIDs of the servers 1 to 3. While transmitting the management information request data to the subagent 45, the master agent 44 converts the protocol of the management information request data from SNMP to AgentX.

The management information request data received from the master agent 44 is transmitted to the servers 1 to 3 by the subagent 45. In the process, the subagent 45 acquires the communication setting information of the destination server from the server information data base 47 based on the OID of the management information request data, and converts the protocol of the management information request data based on the communication setting information thus acquired. For example, in the case where the management information request data is transmitted to the server 1, the subagent 45 transmits the management information request data by converting the protocol thereof from AgentX to TCP/IP. On the other hand, in transmitting the management information request data to the server 2, the subagent 45 converts the protocol of the management information request data from AgentX to IPMI. Further, in transmitting the management information request data to the server 3, the subagent 45 converts the protocol of the management information request data from AgentX to SNMPv3.

In the process, the subagent 45 converts the protocol while at the same time converting the OID of the management information request data depicted in FIG. 2A into the OID shared by the MIB 12, 26, 36 of the servers 1 to 3 depicts in FIG. 2B as a proxy server OID. For example, in the case where the OID of the management information request data received from the master agent 44 is "enterprises.211.1.31.1.2.1.10", the subagent 45 replaces "1" indicating the destination server 1 with "100". Specifically, the subagent 45 converts the OID of the management information request data into "enterprises.211.1.31.1.2.100.10" and transmits it to the server 1. By doing so, the agent of each of the destination servers 1 to 3 can acquire the management information by reference to the MIB 16, 26, 36, of the servers 1 to 3, respectively, because of the proxy server OID.

In the server 1, the agent 14 that has received the management information request data from the subagent 45 of the server management unit 14 acquires the management information of the server 1 with reference to the MIB 16 based on the OID of the management information request data received. Then, the agent 14 transmits the acquired management information of the server 1 to the subagent 45 as a response data. These control operations are performed by the communication processing unit 141, the OID analyzing unit 142 and the information acquisition unit 143 of the agent 14. The communication processing unit 141 executes the communication process with the TCP/IP packet transmitted or received. The OID analyzing unit 142 analyzes the OID of the management information request data by accessing the MIB 16. The information acquisition unit 143 acquires the management information of the server 1 based on the result of the analysis by the OID analyzing unit 142.

In the server 2, the agent 24 that has received the management information request data from the subagent 45 of the server management unit 4 acquires the management information of the server 2 with reference to the MIB 26 based on the OID of the management information request data thus received. Then, the agent 24 transmits the acquired management information as a response data to the subagent 45. These control operations are performed by the information acquisition unit 241 of the agent 24 which acquires the management information of the server 2 with reference to the MID 26 based on the OID of the management information request data received.

In the server 3, the master agent 34 that has received the management information request data from the subagent 45 of the server management unit 4 converts the protocol of the management information request data to AgentX and transmits the converted protocol to the subagent 35. The subagent 35 acquires the management information of the server 3 with reference to the MIB 36 based on the OID of the management information request data thus received. Then, the subagent 35 transmits the acquired management information to the master agent 34 as a response data. In the master agent 34, the protocol of the management information response data received from the subagent 35 is converted from AgentX to SNMPv3 and transmitted to the subagent 45 of the server management unit 4.

In the server management unit 4, the protocol of the management information response data transmitted from the servers 1 to 3 is converted by the subagent 45 to AgentX from the various communication protocols (TCP/IP, IPMI, SNMPv3) with the servers 1 to 3 and transmitted to the master agent 44. In the master agent 44, the protocol of the management information response data received from the subagent 45 is converted from AgentX to SNMP and transmitted to the control manager 6. The control manager 6 can acquire the management information of each of the servers 1 to 3 based on the received management information response data.

In the server system according to this embodiment, the management information of the servers 1 to 3 connected to the server management unit 4 can be acquired by the control manager 6 communicating with the server management unit 4 according to SNMP.

Next, a specific configuration of the master agent 44 and the subagent 45 will be explained below with reference to FIGS. 3 and 4.

Figure 3:
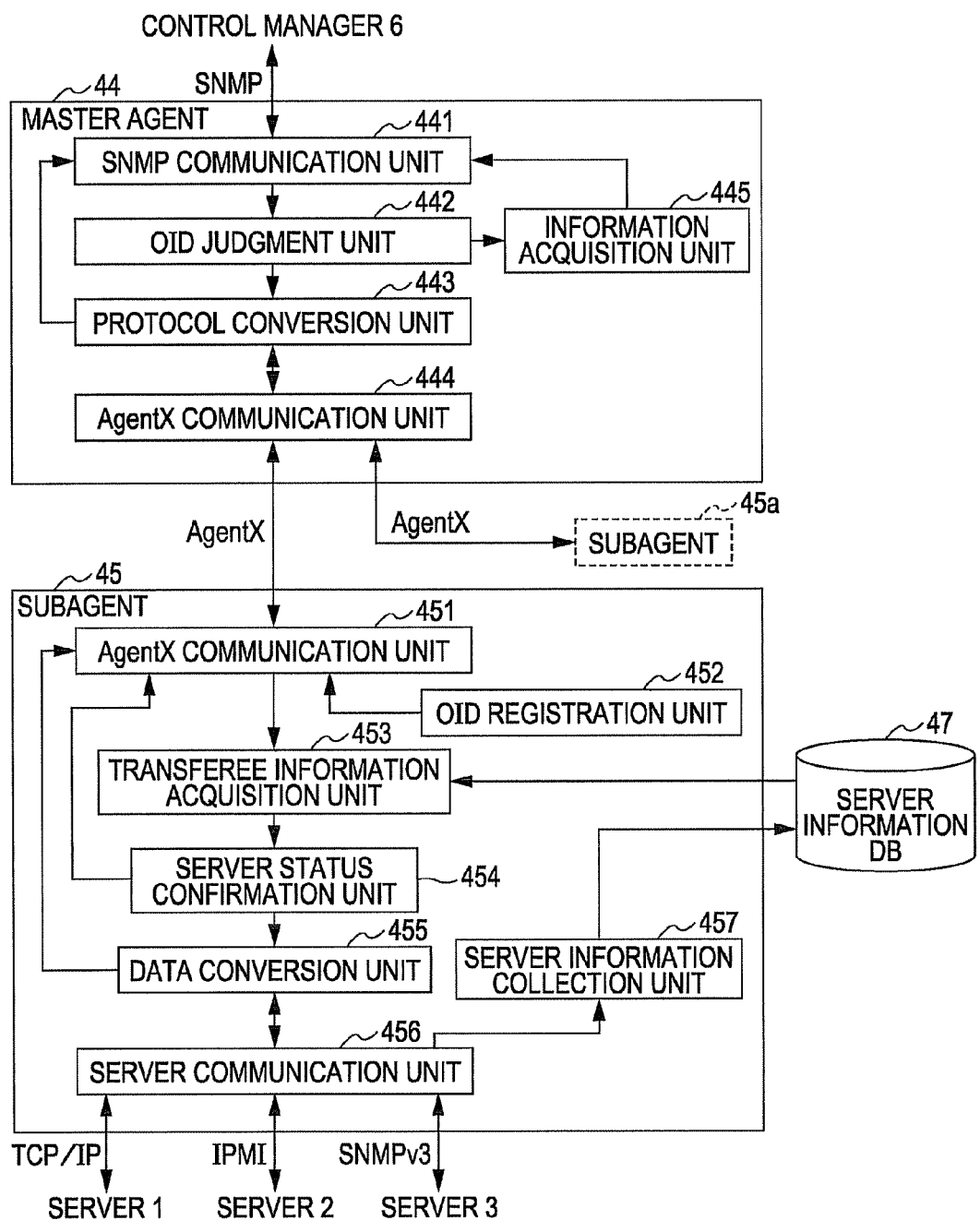
FIG. 3 is a schematic diagram depicting an example of a specific configuration of a subagent.

FIG. 3 is a schematic diagram depicting an example of the configuration of the master agent 44 and the subagent 45.

First, the configuration of the master agent 44 will be explained below. The master agent 44 includes a SNMP communication unit 441, an OID judgment unit 442, a protocol conversion unit 443 and an AgentX communication unit 444.

The SNMP communication unit 441 communicates with the control manager 6 according to the SNMP protocol. Specifically, the SNMP communication unit 441 receives the management information request data from the control manager 6, and transmits the management information response data to the control manager 6 which is requested to be processed.

The OID judgment unit 442 judges to which the management information request data is to be transmitted based on the OID of the management information request data received from the control manager 6. For example, in the case where the OID of the management information request data received from the control manager 6 is the standard MIB, the OID judgment unit 442 judges that the management information of the server management unit 4 is requested and requests the information acquisition unit 445 to execute the requested process. In this case, the information acquisition unit 445 acquires the management information of the server management unit 4 with reference to the MIB 46 based on the OID of the management information request data, and requests the SNMP communication unit 441 to execute the requested process with the acquired management information as a response data.

The memory 43 has registered therein the OID defined in such a manner that the servers 1 to 3 can be identified. In the case where the OID of the management information request data is the extension MIB and matches with any OID of the servers 1 to 3 registered in the memory 43, then the OID judgment unit 442 judges that the management information for each of the servers 1 to 3 is requested. In this case, the OID judgment unit 442 determines the subagent 45 as the destination of the particular management information request data and requests the protocol conversion unit 443 to process the management information request data.

In the case where the OID of the management information request data is the extension MIB and fails to correspond to any OID of the servers 1 to 3 registered in the memory 43, on the other hand, the OID judgment unit 442 judges that the management information of the server management unit 4 not defined in the standard MIB is to be acquired. In this case, the OID judgment unit 442 determines the destination of the management information request data as another subagent 45a than the subagent 45, and requests the protocol conversion unit 443 to process the particular management information request data. The subagent 45a is the one which acquires the management information of the server management unit 4 not defined in the standard MIB and has a different function than the subagent 45 for transferring the management information request data to the servers 1 to 3.

The protocol conversion unit 443 generates the packets by converting the protocol of the management information request data from SNMP to AgentX, and requests the AgentX communication unit 444 to process the packets thus generated. Also, the protocol conversion unit 443 generates the packets by converting the protocol of the management information response data received by the AgentX communication unit 444 from AgentX to SNMP, and requests the SNMP communication unit 441 to process the packets thus generated.

The AgentX communication unit 444 communicates with the subagents 45, 45a according to the AgentX protocol. The AgentX communication unit 444 transmits the management information request data involved to any one of the subagents 45, 45a based on the destination determined by the OID judgment unit 442. Also, the AgentX communication unit 444 receives the management information response data from the subagents 45, 45a.

The subagent 45a accesses the MIB 46 based on the management information request data thus received and acquires the management information of the server management unit 4 not defined in the standard MIB, and transmits the acquired management information to the master agent 44 as a response data.

Next, the configuration of the subagent 45 will be explained below. The subagent 45 includes an AgentX communication unit 451, an OID registration unit 452, a transferee information acquisition unit 453, a server status confirmation unit 454, a data conversion unit 455, a server communication unit 456 and a server information collection unit 457.

The AgentX communication unit 451 communicates with the master agent 44 according to the AgentX protocol. The AgentX communication unit 451 receives the management information request data from the master agent 44 on the one hand, and transmits the management information response data involved to the master agent 44 on the other hand.

At the time of activating the subagent 45, the OID registration unit 452 registers the OID defined in the memory 43 in such a manner that the servers 1 to 3 can be identified. As a result, the OID judgment unit 442 of the master agent 44 can identify each of the servers 1 to 3 and, the OID judgment unit 442 can transmit the request data to the subagent 45 upon reception of the management information request data of each of the servers 1 to 3 from the control manager 6.

The transferee information acquisition unit 453 acquires the server information for the server indicated by the OID of the management information request data, i.e. the transferee information from the table of the server information data base 47.

Now, the server information stored in the table of the server information data base 47 will be explained below with reference to FIG. 4.

FIG. 4 is a diagram depicting an example of the server information stored in the table of the server information data base 47.

In the case of FIG. 4, the table of the server information data base 47 has stored therein the server information of such items as the "identifier", the "OID", the "status information", the "IP address", the "communication method", the "authentication method", the "encryption method", the "account" and the "password".

The "identifier" is the name specifying each of the servers 1 to 3 connected to the server management unit 4, and the "OID" indicates the OID of each of the servers 1 to 3. The information stored in the "identifier" and the "OID", which are recorded beforehand in the files corresponding to each other, are acquired from the same files at the time of activation of the subagent 45 and stored in the table of the server information data base 47.

The information on each item of the "status information", the "IP address", the "communication method", the "authentication method", the "encryption method", the "account" and the "password" are stored in the table of the server information data base 47 in correspondence with the "OID" of each of the servers 1 to 3.

The "status information" indicates whether each of the servers 1 to 3 is activated or deactivated. In the case of FIG. 4, "RUNNING" information is stored as the "status information" in the case where each of the servers 1 to 3 is activated, and "OFF" information is stored in the case where each of the servers 1 to 3 is deactivated. Therefore, it is understood that the servers 1 and 3 are activated and the server 2 is deactivated the case of FIG. 4.

The "IP address" indicates the one set in the NIC of each of the servers 1 to 3. The "communication method" indicates the communication protocol between the server management unit 4 and each of the servers 1 to 3. The "authentication method" and the "encryption method" indicate the methods of authentication and encryption, respectively, for the communication between the server management unit 4 and each of the servers 1 to 3. The "account" and the "password" indicate the authentication information for the subagent 45 to access each of the servers 1 to 3. The information including the "IP address", the "communication method", the "authentication method", the "encryption method", the "account" and the "password" are the communication setting information needed for the subagent 45 to communicate with the servers 1 to 3. The server information stored in the table of the server information data base 47 are roughly divided into the status information indicating the status of the servers and the communication setting information needed for the subagent 45 to communicate with the servers 1 to 3.

Returning to FIG. 3, the explanation will be continued. The server status confirmation unit 454 confirms the status of the server indicated by the OID of the management information request data based on the "status information" in the server information acquired by the transferee information acquisition unit 453. The server status confirmation unit 454 generates the error response data indicating the deactivation of the server upon judgment that the particular server is deactivated, and requests the AgentX communication unit 451 to process the error response data thus generated. On the other hand, upon judgment that the server is in activated state, then the server status confirmation unit 454 requests the data conversion unit 455 to process the management information request data. [0063]

The data conversion unit 455 generates the packets by converting the management information request data from the AgentX protocol to the protocol of the desired communication method based on the "communication method" in the acquired server information. In the process, the data conversion unit 455 generates the packets by adding the communication setting information other than the "communication method" in the server information, i.e. each information of the "IP address", the "authentication method", the "encryption method", the "account" and the "password". At the same time, the data conversion unit 455 converts the OID of the management information request data depicted in FIG. 2A to the OID defined equally as a proxy for each of the servers 1 to 3 depicted in FIG. 2B. The data conversion unit 455 requests the server communication unit 456 to process the management information request data thus converted.

Also, in the data conversion unit 455, the management information response data received from the servers 1 to 3 by the server communication unit 456 are converted from the various protocols (e.g. TCP/IP, IPMI and SNMPv3) to AgentX based on the communication setting information of the servers 1 to 3 thereby to generate the packets. Then, the data conversion unit 455 requests the AgentX communication unit 451 to process the packets of the management information response data generated.

In the server communication unit 456, the packets of the management information request data requested by the data conversion unit 455 to process are transmitted to the servers 1 to 3, while at the same time receiving the management information response data from each of the servers 1 to 3. The server communication unit 456 also executes the process of receiving the server information notified from each of the servers 1 to 3 at the time of activation and deactivation thereof. The agent of each of the servers 1 to 3 transmits the status information indicating the activation of the servers and the communication setting information as the data of the server information to the server communication unit 456 in the boot sequence thereof. The agent of each of the servers 1 to 3 transmits the status information indicating the deactivation of the servers as the data of the server information to the server communication unit 456 before complete deactivation of the server in the shutdown sequence thereof. The server communication unit 456 receives the data of these server information.

The server information collection unit 457 causes the server information received by the server communication unit 456 to be stored in the table of the server information data base 47. As a result, the server information in the table of the server information data base 47 is dynamically updated.

The process of controlling the subagent 45 at the time when the control manager 6 gives a request to each of the servers 1 to 3 to acquire the management information is explained with reference to FIG. 5.

Figure 5:
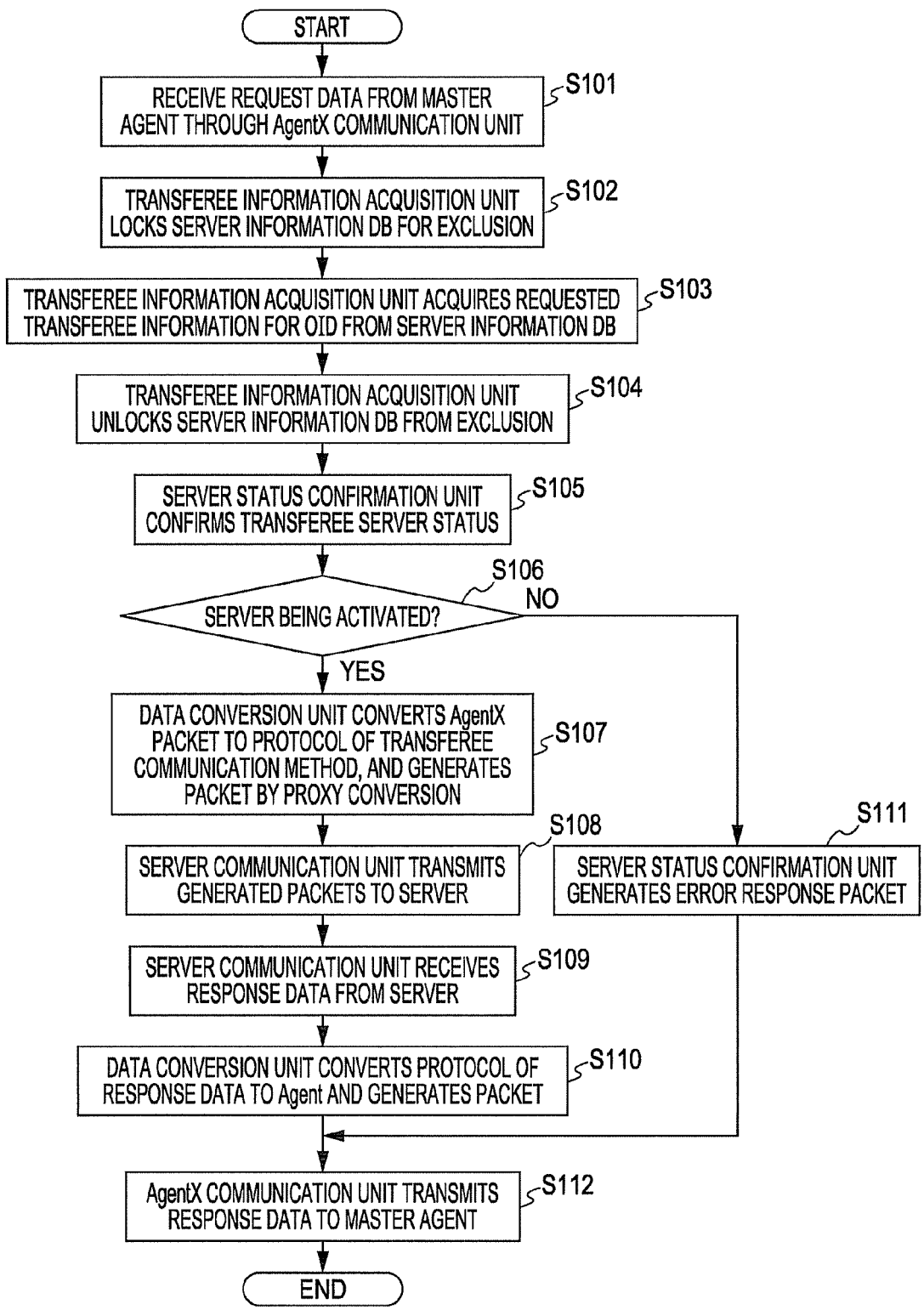
FIG. 5 is a flowchart depicting the subagent control process for acquisition of the management information.

FIG. 5 is a flowchart depicting the subagent control process at the time of acquiring the management information. First, the control process of the subagent 45 at the time of requesting the management information acquisition from the server 1 will be explained below. A explanation is made here as an example in a case that a request is given to acquire the OS name information of the server 1. In this case, the control manager 6 accesses the MIB 66 having the OID tree structure depicted in FIG. 2A so that the management information request data with the OID designated as "enterprises.211.1.31.1.2.1.10" is transmitted to the master agent 44 of the server management unit 4. In the master agent 44, the protocol of the management information request data received is converted from SNMP to AgentX for transmission to the subagent 45. The subagent 45 receives the management information request data through the AgentX communication unit 451 (S101).

Once the AgentX communication unit 451 receives the management information request data, the table of the server information data base 47 is locked for exclusion by the transferee information acquisition unit 453 (S102). The exclusion by the transferee information acquisition unit 453 is in order to prevent the data conflict which otherwise might be caused by the server information collection unit 457 updating the server information data base 47 during the acquisition of the server information by the transferee information acquisition unit 453. The transferee information acquisition unit 453 acquires the transferee information of the transferee server corresponding to the OID of the management information request data by searching the table of the server information data base 47 after locking the table of the server information data base 47 for exclusion (S103). In the case under consideration, the transferee information acquisition unit 453 compares the OID "enterprises.211.1.31.1.2.1.10" of the management information request data with the "OID" of each of the servers 1 to 3 in the table of the server information data base 47. Then, the transferee information acquisition unit 453 detects the server information of the server 1 which coincides with the portion ("enterprises.211.1.31.1.2.1") of the OID indicating the server in the management information request data and acquires it from the server information data base 47. In this case, the transferee information acquisition unit 453 acquires the server information including the "status information", the "IP address", the "encryption method" and the "password" in the identifier "server 1" (see FIG. 4). The transferee information acquisition unit 453 unlocks the table of the server information data base 47 from the exclusion after detecting the server information corresponding to the OID of the management information request data (S104).

The server status confirmation unit 454 confirms the status of the transferee server based on the "status information" in the server information acquired by the transferee information acquisition unit 453 (S105). The server status confirmation unit 454 proceeds to S107 upon judgment that the transferee server is in the activated state (YES in S106). On the other hand, the server status confirmation unit 454 proceeds to S111 upon judgment that the transferee server is deactivated (NO in S106). In the case of FIG. 4, the "status information" of the server 1 is "RUNNING", and therefore, the server status confirmation unit 454 judges that the server 1 is being activated and proceeds to S107.

In S107, the data conversion unit 455 confirms the communication method of the transferee based on the server information acquired by the transferee information acquisition unit 453, and generates the packets by converting the protocol of the management information request data from AgentX to that of the communication method of the transferee. In the case of FIG. 4, the data conversion unit 455 confirms from the "communication method" of the server information that the communication method of the transferee is TCP/IP, and generates the packets by converting the protocol of the management information request data from AgentX to TCP/IP. In the process, the data conversion unit 455 adds the information of the "IP address", the "encryption method" and the "password" to the packets generated. Also, while generating the packets, the data conversion unit 455 converts the OID of the management information request data to the one shared by the servers 1 to 3 as a proxy. Specifically, in the data conversion unit 455, the seventh element "1" defined by "." and indicating the server 1 in the OID "enterprises.211.1.31.1.2.1.10" of the management information request data is replaced with "100" shared by the servers with the result that "enterprises.211.1.31.1.2.1.10" is converted to "enterprises.211.1.31.1.2.100.10".

The packets generated by the data conversion unit 455 are transmitted by the server communication unit 456 to the transferee server (S108). In this case, the server communication unit 456 transmits the packets of the management information request data to the server 1. In the agent 14 of the server 1, the OID of the management information request data is analyzed by the OID analyzing unit 142 upon reception of the packet of the management information request data from the server management unit 4 through the communication processing unit 141. The OID analyzing unit 142 accesses the MIB 16 based on the OID "enterprises.211.1.31.1.2.100.10" of the management information request data, and detects that the OS name information "os name" is desired by the server management unit 4. The information acquisition unit 143 acquires the OS name information of the server 1 from the OS and requests the communication processing unit 141 to transmit the acquired OS name information as the response data of the management information. The communication processing unit 141 transmits the management information response data to the server management unit 4 according to TCP/IP.

The server communication unit 456 receives the management information response data transmitted from the server 1 (S109). After that, the data conversion unit 455 confirms the communication method of the transferee server based on the server information acquired by the transferee information acquisition unit 453 and generates the packets by converting the protocol of the management information response data from the communication method of the transferee serverto-AgentX (S110). In the case under consideration, the data conversion unit 455 converts the protocol of the management information response data from TCP/IP to AgentX thereby to generate the packets. After generation of the packets of the management information response data, the data conversion unit 455 requests the AgentX communication unit 451 to process the packets of the management information response data thus generated. The AgentX communication unit 451 transmits the management information response data to the master agent 44 (S112) and ends the control process of the subagent 45. After that, the management information response data received from the subagent 45 is transmitted by the master agent 44 to the control manager 6. As a result, the control manager 6 can acquire the intended management information, i.e. the OS name information of the server 1.

Next, the control process of the subagent 45 at the time of requesting the acquisition of the management information of the server 2 will be explained below. This case also represents an example in which the acquisition of the OS name information of the server 2 is requested. In this case, the control manager 6 accesses the MIB 66 having the OID tree structure depicted in FIG. 2A, and the management information request data with the OID is transmitted to the master agent 44 of the server management unit 4, wherein the OID designated as "enterprises.211.1.31.1.2.2.10". In the master agent 44, the protocol of the management information request data received is converted from SNMP to AgentX and transmitted to the subagent 45. The subagent 45 receives the management information request data through the AgentX communication unit 451 (S101).

Once the AgentX communication unit 451 receives the management information request data, the transferee information acquisition unit 453 locks the table of the server information data base 47 for exclusion (S102). The transferee information acquisition unit 453 compares the OID "enterprises.211.1.31.1.2.2.10" of the management information request data with the "OID" of each of the servers 1 to 3 in the table of server information data base 47 thereby to detect and acquire the server information of the server 2 ("enterprises.211.1.31.1.2.2"). The transferee information acquisition unit 453 unlocks the table of the server information data base 47 from the exclusion after detecting the server information corresponding to the OID of the management information request data (S104).

The server status confirmation unit 454 confirms the state of the transferee server based on the server information acquired by the transferee information acquisition unit 453 (S105). And, the server status confirmation unit 454 judges whether the transferee server is activated or not (S106). In the case under consideration, the "status information" of the server 2 is "OFF" (see FIG. 4), and therefore, the server status confirmation unit 454 judges that the server 2 is being deactivated and proceeds to S111.

The server status confirmation unit 454 generates an error response data indicating that the server 2 is deactivated (S111). And, the server status confirmation unit 454 requests the AgentX communication unit 451 to make responses to the requests. The AgentX communication unit 451 transmits the error response data to the master agent 44 (S112) thereby to end the control process of the subagent 45. After that, the error response data received from the subagent 45 is transmitted by the master agent 44 to the control manager 6. As a result, the control manager 6 can recognize the deactivation of the server 2.

Next, the control process of the subagent 45 at the time of requesting the acquisition of the management information of the server 3 will be explained below. This case also represents an example in which the acquisition of the OS name information of the server 3 is requested.

In this case, the control manager 6 accesses the MIB 66 having the OID tree structure depicted in FIG. 2A, so that the management information request data with the OID designated as "enterprises.211.1.31.1.2.3.10" is transmitted to the master agent 44 of the server management unit 4. In the master agent 44, the protocol of the management information request data received is converted from SNMP to AgentX for transmission to the subagent 45. The AgentX communication unit 451 of the subagent 45 receives the management information request data (S101).

Once the AgentX communication unit 451 receives the management information request data, the transferee information acquisition unit 453 locks the table of the server information data base 47 for exclusion (S102). Then, the transferee information acquisition unit 453 compares the OID "enterprises.211.1.31.1.2.3.10" of the management information request data with the "OID" of each of the servers 1 to 3 in the table of the server information data base 47 thereby to detect and acquire the server information of the server 3 ("enterprises.211.1.31.1.2.3") (S103). Specifically, the transferee information acquisition unit 453 acquires each information including the "status information", the "IP address", the "authentication method", the "encryption method", the "account" and the "password" in the server 3. The transferee information acquisition unit 453 unlocks the table of the server information data base 47 from the exclusion after detecting the server information corresponding to the OID of the management information request data (S104).

The server status confirmation unit 454 confirms the status of the transferee server after detecting the server information corresponding to the OID of the management information request data (S105). Then, the server status confirmation unit 454 judges whether the transferee server is activated or not (S106). Since the "status information" of the server 3 is "RUNNING" (see FIG. 4), the server status confirmation unit 454 judges that the server 3 is being activated and proceeds to S107.

The data conversion unit 455 generates the packets by converting the protocol of the management information request data from AgentX to SNMPv3 by confirming from the "communication method" of the server information that the communication method of the server 3, i.e. the transferee server, is SNMPv3. In the process, the data conversion unit 455 adds each information of the "IP address", the "authentication method", the "encryption method", the "account" and the "password" to the generated packets. Also, when the data conversion unit 455 generates the packets, the OID "enterprises.211.1.31.1.2.3.10" of the management information request data received from the master agent 44 is converted to the OID "enterprises.211.1.31.1.2.100.10" shared by the servers as a proxy.

The packets of the management information request data generated by the data conversion unit 455 are transmitted by the server communication unit 456 to the server 3 (S108). The master agent 34 of the server 3, transmits the received request data to the subagent 35 of the server 3 upon reception of the packets of the management information request data from the server management unit 4. The subagent 35, by accessing the MIB 36 based on the OID "enterprises.211.1.31.1.2.100.10" of the management information request data, detects that the management information is "os name". Then, the subagent 35 acquires the OS name information of the server 3 from the OS and transmits the acquired OS name information to the master agent 34 as a management information response data. The management information response data transmitted from the subagent 35 is transmitted by the master agent 34 to the server management unit 4 according to SNMPv3.

The server communication unit 456 receives the management information response data transmitted from the server 3 (S109). After that, the data conversion unit 455 generates the packets by converting the protocol of the management information response data from SNMPv3 to AgentX (S110). After generating the packets, the data conversion unit 455 requests the AgentX communication unit 451 to process the generated packets of the management information response data. The AgentX communication unit 451 transmits the packets of the management information response data to the master agent 44 (S112) thereby to end the control process of the subagent 45. After that, the master agent 44 transmits the management information response data to the control manager 6. As a result, the control manager 6 can acquire the intended management information, i.e. the OS name information of the server 3 in the case under consideration.

As understood from the foregoing description, the server system according to this embodiment converts the protocol at the time of transmitting or receiving the information between the server management unit 4 and each of the servers 1 to 3. Therefore, the protocol other than SNMP can be used as a communication protocol between the server management unit 4 and each of the servers 1 to 3 in the server system of this embodiment. The server system according to this embodiment can use a protocol for example such as the reliable TCP/IP, the IPMI high in extensibility or the SNMPv3 having a strengthened security function as compared with SNMP. Also, since the subagent 45 converts the protocol, the master agent 44 is not required to have the protocol conversion function and system inventive can be improved. Further, the proxy conversion by the subagent 45 eliminates the need of the SNMP proxy function of the master agent 44. Therefore, the server management information can be acquired free of the effect of activation/deactivation of other servers than the one from which the management information is to be acquired.

Also, in the server system according to this embodiment, the communication setting information stored in the server information data base 47 includes not only the communication protocol but also such information as the IP address and the account information. The subagent 45 not only converts the protocol of the management information request data but also adds such information as the IP address and the account information and transmits the resulting management information request data to each of the servers 1 to 3 based on the communication setting information acquired from the server information data base 47. In a general server system in which the protocol is converted between the server management unit and each server, the information such as the IP address and the account information for communication between the server management unit and each server are managed by the control manager. On the other hand, the information such as the IP address and the account information are managed by the subagent 45 in the server system according to this embodiment. Therefore the server management by the control manager 6 can be simplified as compared with the general server system in the server system according to this embodiment.

Incidentally, the communication protocol used between the server management unit 4 and each of the servers 1 to 3 is not limited to TCP/IP, IPMI and SNMPv3. As compared with SNMP, each of the protocols TCP/IP, IPMI and SNMPv3 is only an example advantageously higher in reliability, extensibility and security than SNMP. Therefore, various other communication protocols (e.g. HyperText Transfer Protocol (HTTP)) can of course be used between the server management unit 4 and each of the servers 1 to 3.

Figure 6:
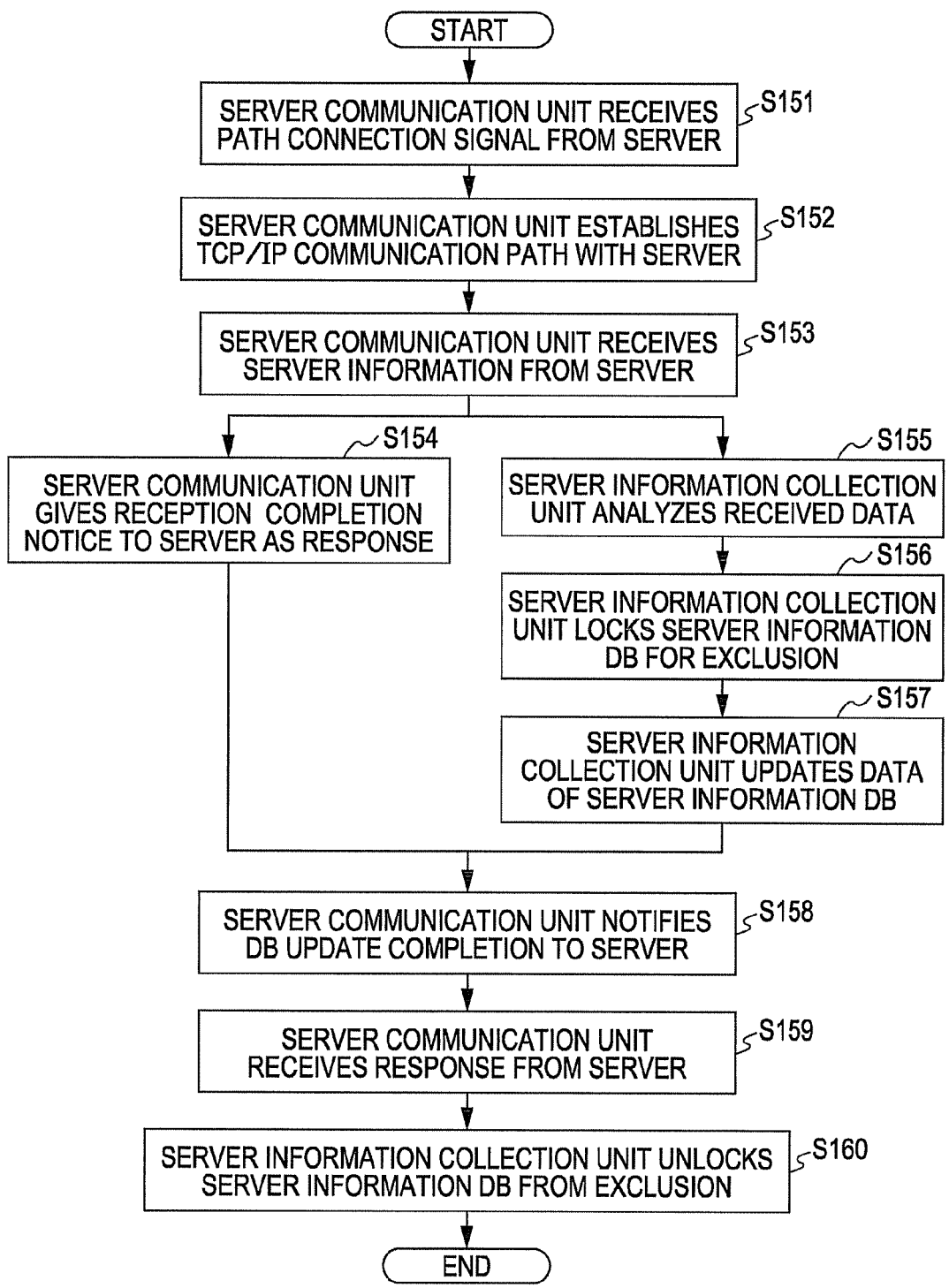
FIG. 6 is a flowchart depicting the subagent control process for activating the server.

Next, the control process of the subagent 45 at the time of activating or deactivating the server will be explained below with reference to FIGS. 6 and 7.

First, the control process of the subagent 45 at the time of activating the server 1 will be explained as an example with reference to the flowchart depicted in FIG. 6. FIG. 6 is a flowchart depicting an example of the control process of the subagent 45 at the time of activating the server 1.

First, the activation of the server 1 activates the agent 14 on the server 1 at the boot sequence. The agent 14 thus activated transmits a path connection signal to the server management unit 4. The subagent 45 of the server management unit 4 receives the connection signal from the server 1 through the server communication unit 456 (S151). Then, the server communication unit 456 establishes the connection for communication with the server 1 according to TCP/IP (S152).

The server communication unit 456 receives from the agent 14 of the server 1 the data having the server information containing the status information and the communication setting information indicating the activation of the server 1 after establishing the connection for communication with the server 1 according to TCP/IP (S153). The server communication unit 456 gives a response indicating the completion of the data reception to the agent 14 of the server 1 upon complete reception of the data (S154). At the same time, the server information collection unit 457 of the subagent 45 acquires the server information of the server 1 by analyzing the data received from the server 1 (S155).

The server information collection unit 457 locks the table of the server information data base 47 for exclusion (S156). The exclusion by the server information collection unit 457 is in order to prevent the data conflict which otherwise might be caused by the transferee information acquisition unit 453 acquiring the server information from the table being updated during the table updating process by the server information collection unit 457. The server information collection unit 457 stores the server information obtained in S155 in the table of the server information data base 47 thereby to update the same table after locking the table of the server information data base 47 for exclusion (S157). In this case, as depicted in FIG. 4, the server information collection unit 457 stores "RUNNING" information in the "status information" in the table of the server information data base 47. And at the same time, the server information collection unit 457 stores each communication setting information contained in the server information in the "IP address", the "authentication method", the "encryption method", the "account" and the "password" respectively.

Upon complete updating of the table of the server information data base 47 by the server information collection unit 457, the server communication unit 456 gives a data base update completion notice to the server 1 (S158). Once the server communication unit 456 receives the response of the server 1 to the data base update completion notice (S159), the server information collection unit 457 unlocks the table of the server information data base 47 from exclusion (S160). After that, the subagent 45 ends this control process.

As described above, the completion of updating the table of the server information data base 47 by the server information collection unit 457 makes it possible for the server status confirmation unit 454 to judge that the server 1 is being activated based on the status information of the server information of the server 1 acquired by the transferee information acquisition unit 453.

Next, the control process of the subagent 45 at the time of deactivation of the server 2 will be explained below as an example with reference to the flowchart of FIG. 7.

Figure 7:
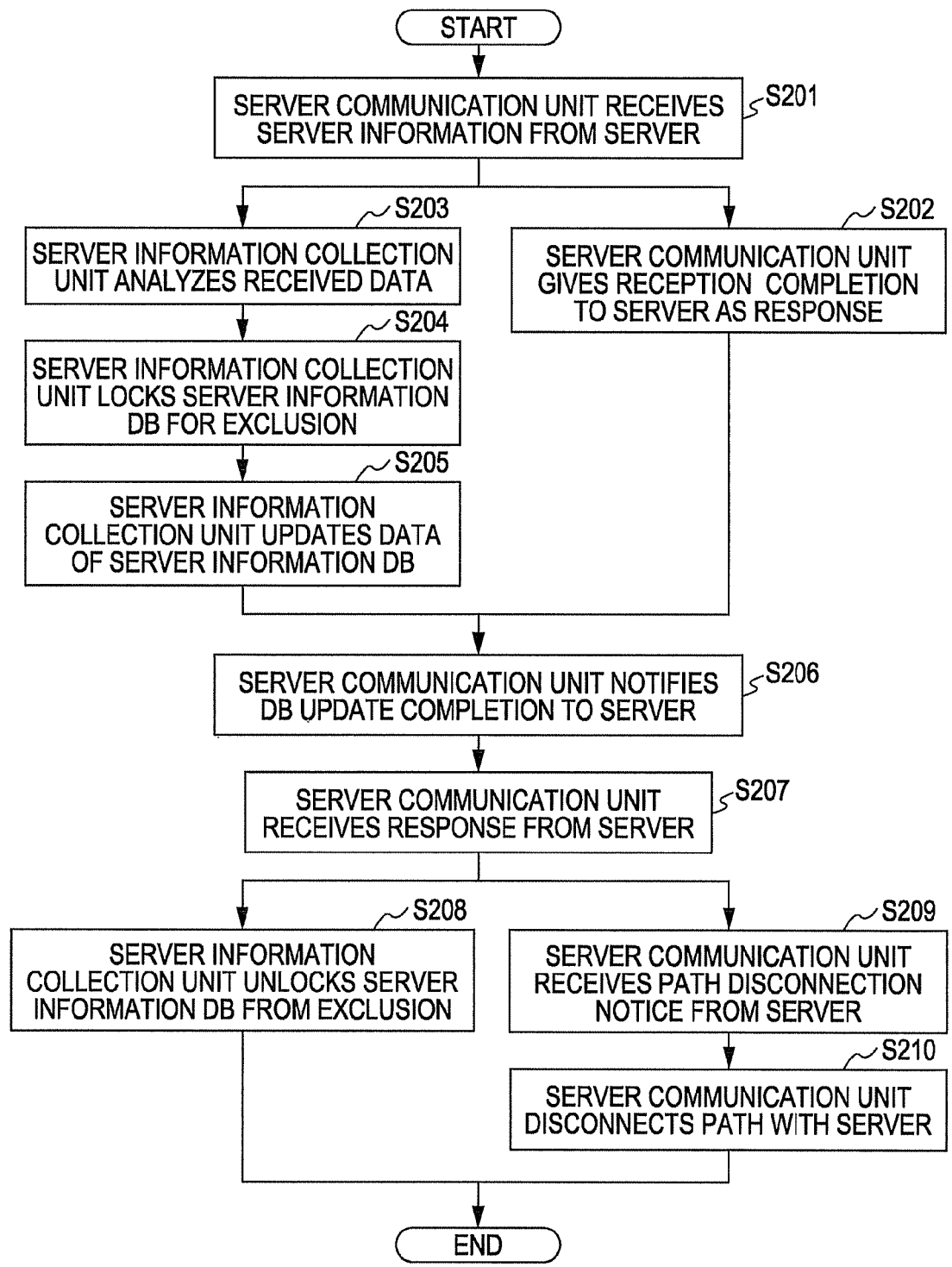
FIG. 7 is a flowchart depicting the subagent control process for deactivating the server.

FIG. 7 is a flowchart depicting an example of the control process of the subagent 45 at the time of deactivation of the server 2. First, upon deactivation of the server 2, the agent 24 on the server 2 is deactivated by the shutdown sequence. At the time of deactivation, the subagent 24 transmits the data of the server information containing the status information indicating the deactivation of the server 2 to the subagent 45 of the server management unit 4. The server communication unit 456 of the subagent 45 receives the particular data from the server 2 (S201).

The server communication unit 456 of the subagent 45 gives a response as a data reception completion to the agent 24 of the server 2 (S202). At the same time, the server information collection unit 457 of the subagent 45 analyzes the data received from the server 2 and acquires the server information of the server 2 (S203).

The server information collection unit 457 locks the table of the server information data base 47 for exclusion (S204). After the locking the table of the server information data base 47, the server information acquired in S203 is stored in the table of the server information data base 47 by the server information collection unit 457 thereby to update the table of the server information data base 47 (S205). In this case, as depicted in FIG. 4, the server information collection unit 457 stores "OFF" information in the "status information" on the table of the server information data base 47 while at the same time erasing the information of the "IP address", the "authentication method", the "encryption method", the "account" and the "password" respectively.

Upon complete updating of the table of the server information data base 47 by the server information collection unit 457, the server communication unit 456 gives a data base update completion notice to the server 2 (S206). Once the server communication unit 456 receives the response from the server 2 to the data base update completion notice (S207), the server information collection unit 457 unlocks the table of the server information data base 47 from the exclusion (S208). Next, the server communication unit 456 receives the signal with a connection path cutoff command from the server 2 (S209). Then, the server communication unit 456 cuts off the connection path to the server 2 (S210). After that, the subagent 45 ends this control process.

By executing the process of S201 to S210 as described above, the server status confirmation unit 454 can judge that the server 2 is being deactivated based on the status information contained in the server information of the server 2 acquired by the transferee information acquisition unit 453.

As understood from the foregoing description, the server information collection unit 457 stores the status information in the table of the server information data base 47 based on the server information received through the server communication unit 456 in the server system according to this embodiment. As a result, the server status confirmation unit 454 can acquire the server status information indicated by the OID in the management information request data from the table of the server information data base 47, thereby making it possible to confirm the activation or deactivation of the particular server.

Also, in the server system according to this embodiment, the subagent 45 of the server management unit 4 receives the server information from each of the servers 1 to 3 at the time of activation or deactivation of each of the servers 1 to 3. And, the subagent 45 of the server management unit 4 stores the received server information in the table of the server information data base 47. As a result, the server information in the table of the server information data base 47, i.e. the status information and the communication setting information are dynamically updated.

Incidentally, this invention is not limited to the embodiments described above, and can be appropriately changed without departing from the spirit and concept of the invention that can be read from the scope of the appended claims and the present specification as a whole.

Therefore, according to an aspect of the embodiments of the invention, any combinations of one or more of the described features, functions, operations, and/or benefits can be provided. The embodiments can be implemented as an apparatus (a machine) that includes computing hardware (i.e., computing apparatus), such as (in a non-limiting example) any computer that can store, retrieve, process and/or output data and/or communicate (network) with other computers. According to an aspect of an embodiment, the described features, functions, operations, and/or benefits can be implemented by and/or use computing hardware and/or software. The apparatus (e.g., the control manager 6, the system 5 including the server management unit 4 and the server(s) 1-3, ..., etc.) comprises a controller (CPU) (e.g., a hardware logic circuitry based computer processor that processes or executes instructions, namely software/program), computer readable recording media, transmission communication media interface (network interface), and/or a display device, all in communication through a data communication bus. In addition, an apparatus can include one or more apparatuses in computer network communication with each other or other apparatuses. In addition, a computer processor can include one or more computer processors in one or more apparatuses in any combinations of one or more. According to an aspect of an embodiment, the operations can be caused to be executed on one or more computer processors. The results produced can be displayed on the display. A program/software implementing the embodiments may be recorded on computer-readable recording media. Examples of the computer-readable recording media include a magnetic recording apparatus, an optical disk, a magneto-optical disk, and/or volatile and/or non-volatile semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), DVD-ROM, DVD-RAM (DVD-Random Access Memory), BD (Blue-ray Disk), a CD-ROM (Compact Disc-Read Only Memory), and a CD-R (Recordable)/RW.

The program/software implementing the embodiments may also be included/encoded as a data signal and transmitted over transmission communication media. A data signal moves on transmission communication media, such as wired network or wireless network, for example, by being incorporated in a carrier wave. The data signal may also be transferred by a so-called baseband signal. A carrier wave can be transmitted in an electrical, magnetic or electromagnetic form, or an optical, acoustic or any other form.

All examples and conditional language recited herein are intended for pedagogical objects to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A management apparatus, connected to a plurality of first information processing apparatuses, to manage the first information processing apparatuses for a second information processing apparatus, comprising:
 a computer processor configured to:
  receive, from the second information processing apparatus, a data request according to a first protocol containing identification information identifying one of the first information processing apparatuses,
  convert the data request according to the first protocol into a data request according to a second protocol, thereby the second information processing apparatus communicably connectable to the first information processing apparatuses through the management apparatus,
  receive the data request according to the second protocol,
  acquire, based on the identification information contained in the data request, communication setting information, including address and communication protocol information, for communicating with the one first information apparatus according to a third protocol,
  convert the received data request according to the second protocol into a data request according to the third protocol, and
  transmit the data request according to the third protocol to the one first information processing apparatus, a type of the third protocol being different depending on the one first processing apparatus correspondence to the acquired address information.

2. The management apparatus according to claim 1,
wherein the computer processor is configured to receive from the first information processing apparatus the address information of the first information processing apparatus and the communication setting information for the communication with the first information processing apparatus at a time of executing one of activating and deactivating the first information processing apparatus, and
store the address information and the communication setting information received from the first information processing apparatus in an information storage.

3. An information processing system comprising:
a plurality of first information processing apparatuses; and
a management apparatus that manages the first information processing apparatuses for a second information processing apparatus,
the management apparatus comprising a computer processor configured to:
 receive, from the second information processing apparatus, a data request according to a first protocol containing identification information that identifies one of the first information processing apparatuses,
 convert the data request according to the first protocol into a data request according to a second protocol, thereby the second information processing apparatus communicably connectable to the first information processing apparatuses through the management apparatus,
 receive the data request according to the second protocol,
 acquire, based on the identification information contained in the data request, communication setting information, including address and communication protocol information, for communicating with the one first information apparatus according to a third protocol,
 convert the received data request according to the second protocol into a data request according to the third protocol,
 transmit the data request according to third protocol to the one first information processing apparatus, a type of the third protocol being different depending on the one first processing apparatus correspondence to the acquired address information, and
 receive from the first information processing apparatuses the address information of the first information processing apparatuses and the communication setting information for the communication with the first information processing apparatuses at a time of executing one of activating and deactivating the first information processing apparatuses.

4. A control method for a management apparatus, connected to a plurality of first information processing apparatuses, to manage the first information processing apparatuses for a second information processing apparatus, the management apparatus including a master processing agent and a processing subagent, the control method comprising:

causing a computer processor of the management apparatus to execute operations of:

receiving by the master processing agent, from the second information processing apparatus, a data request according to a first protocol containing identification information identifying one of the first information processing apparatuses, converting the data request according to the first protocol into a data request according to a second protocol for the subagent, thereby the second information processing apparatus communicably connectable to the first information processing apparatuses through the management apparatus; and executing by the processing subagent operations including:

receiving, from the master processing agent, the data request according to the second protocol;

acquiring, based on the identification information contained in the data request, communication setting information, including address and communication protocol information, for communicating with the one first information apparatus according to a third protocol;

converting the received data request according to the second protocol from the master processing agent into a data request according to the third protocol; and transmitting the data request according to the third protocol to the one first information processing apparatus, a type of the third protocol being different depending on the one first processing apparatus correspondence to the acquired address information.

5. A non-transitory computer-readable recording medium to store a control program for a management apparatus, connected to a plurality of first information processing apparatuses, to manage the first information processing apparatuses for a second information processing apparatus, the control program causing a computer processor included in the management apparatus to execute operations of:

receiving by a master processing agent, from the second information processing apparatus, a data request according to a first protocol containing identification information identifying one of the first information processing apparatuses, converting the data request according to the first protocol into a data request according to a second protocol for the subagent, thereby the second information processing apparatus communicably connectable to the first information processing apparatuses through the management apparatus; and executing by the processing subagent operations including:

receiving, from the master processing agent, the data request according to the second protocol;

acquiring, based on the identification information contained in the data request, communication setting information, including address and communication protocol information, for communicating with the one first information apparatus according to a third protocol;

converting the received data request according to the second protocol from the master processing agent into a data request according to the third protocol; and transmitting the data request according to the third protocol to the one first information processing apparatus, a type of the third protocol being different depending on the one first processing apparatus correspondence to the address information.

6. The apparatus according to claim 1, wherein the computer processor is configured to convert the identification information identifying the one first information apparatus into proxy identification information shared by the plurality of the first information apparatuses.

7. A management apparatus connected to a plurality of first information processing apparatuses to manage the first information processing apparatuses for a second information processing apparatus, comprising:

a computer processor that executes a master agent and a subagent:

the master agent receives, from the second information processing apparatus, a data request according to a first protocol containing identification information identifying one of the first information processing apparatuses, converts the data request according to the first protocol into a data request according to a second protocol for the subagent, thereby the second information processing apparatus communicably connectable to the first information processing apparatus through the management apparatus; and the subagent:

receives, from the master agent, the data request according to the second protocol, acquires, based on the identification information contained in the data request, communication setting information, including address and communication protocol information, for communicating with the one first information apparatus according to a third protocol, converts the received data request according to the second protocol into a data request according to the third protocol, and transmits the data request according to the third protocol to the one first information processing apparatus, a type of the third protocol being different depending on the one first processing apparatus correspondence to the acquired address information.

\* \* \* \* \*